United States Patent [19]
Graefe

[11] Patent Number: 5,842,581
[45] Date of Patent: Dec. 1, 1998

[54] PORTABLE BICYCLE REPAIR RACK

[76] Inventor: Gary R. Graefe, 1940 Soda Mtn Rd., Ashland, Oreg. 97520

[21] Appl. No.: 808,254

[22] Filed: Feb. 28, 199

Related U.S. Application Data

[60] Provisional application No. 60/035,457 Jan. 16, 1997. 7

[51] Int. Cl.⁶ ........................................................ A47F 7/00
[52] U.S. Cl. ........................... 211/17; 211/18; 211/86.01; 211/119.004; 248/218.4
[58] Field of Search ................................ 211/18, 17, 106, 211/86.01, 87.01, 119.004; 248/300, 218.4, 219.4

[56] References Cited

U.S. PATENT DOCUMENTS

| | | |
|---|---|---|
| 2,689,101 | 9/1954 | Dygert . |
| 2,925,916 | 2/1960 | Pollock ............................. 211/119.004 |
| 3,746,294 | 7/1973 | Johnston . |
| 4,101,107 | 7/1978 | Antoszewski ......................... 248/218.4 |
| 4,343,404 | 8/1982 | Folsom ..................................... 211/17 |
| 5,078,276 | 1/1992 | Rogge et al. ............................. 211/18 |
| 5,263,675 | 11/1993 | Roberts et al. ....................... 248/219.4 |
| 5,332,104 | 7/1994 | Santella ..................................... 211/18 |
| 5,388,709 | 2/1995 | Adams ................................... 211/70.6 |
| 5,593,121 | 1/1997 | Tackett ................................ 248/218.4 |

OTHER PUBLICATIONS

United Bicycle Tool Catalog, Fall/Winter 1996, pp. 48, 49, & 50.
Bike Nashbar Catalog, Spring 1997 #119, pp. 56 & 60.
Performance Bicycle Catalog Spring 1997, pp. 63, 64 & 65.

*Primary Examiner*—Robert W. Gibson, Jr.
*Attorney, Agent, or Firm*—Kolisch Hartwell Dickinson McCormack & Heuser

[57] ABSTRACT

A portable bicycle repair rack is disclosed which adjustably supports a bicycle for the maintenance or repair thereof, using a common door as a vertical support member.

44 Claims, 4 Drawing Sheets

PORTABLE BICYCLE REPAIR RACK

BACKGROUND—CROSS-REFERENCES TO RELATED APPLICATIONS

This application claims the benefit of U.S. application Ser. No. 60/35,457, Filing Date 16 Jan. 1997.

BACKGROUND—FIELD OF INVENTION

This invention relates generally to work holders or repair stands which support a bicycle at a convenient height during the performance of maintenance and repairs, and particularly to work holders that use a common door as a vertical support member.

BACKGROUND—DESCRIPTION OF PRIOR ART

To facilitate the efficient performance of maintenance and repairs on a bicycle and eliminate the inefficiency and resultant fatigue that result from working on an object near floor level, the bicycle must be supported at a convenient elevation above the work space floor. Furthermore, adjustability of elevation is highly desirable. Supporting a bicycle at an elevation convenient for access to the portion of the bicycle in need of attention enables the mechanic to easily inspect or work on that portion of the bicycle, and allows the drive train and other components to be operated while making adjustments. Secondarily, sources of both artificial and natural lighting are generally more readily available at mid- to upper room elevations, and are thereby capable of providing greater illumination of the bicycle without having to resort to cumbersome portable lighting devices. These desirable conditions are readily apparent to bicycle shop owners, professional bicycle mechanics, bicycle enthusiasts, and recreational bicyclists, all of whom have a need for some type of bicycle supporting device or work stand.

Various types of bicycle supporting devices, or work stands, have been produced in an attempt to fulfill the aforementioned needs. The most common of these devices utilizes a metal post as a vertical support member, the post typically being attached to a heavy metal base plate which rests on, and in some cases is attached to, the floor. Typically the other end of the post has a clamping device which clamps to a bicycle frame member. The metal base plate is needed to compensate for the bicycle's weight, thereby insuring that the stand and supported bicycle remain upright. Variations of this design include an assortment of leg types and arrangements to replace the metal base plate. Another variation simply mounts a shorter vertical post to a sturdy work bench in lieu of any type of base plate or legs.

All bicycle support stands of this type share the common design element of an integral vertical support member. This results in several unavoidable conditions and limitations on the range of circumstance in which the stand can be readily used. The necessary rigidity, bulk and weight of the vertical support post and base dictate that the stand is most often placed in a permanent, fixed location with the position of the bicycle frame clamping apparatus set at a fixed height. Additionally, the purchase price of these work stands is relatively high. For these reasons, such a stand is found almost exclusively in bicycle shops where the bulkiness and cost can be more readily justified and accommodated. Even those designs which have been reduced in size and weight to achieve a degree of locational flexibility, are neither easily portable nor inexpensive, and therefore their range of usefulness remains limited.

Yet another repair stand design, which closely resembles a three-legged saw horse constructed of metal, achieves a degree of portability but sacrifices any elevation adjustment capabilities. This stand also requires that the bicycle's front wheel be removed to enable placing the bicycle in the stand. Additionally, this stand's weight and bulk are not readily conducive to ease of transportation or storage.

A search of prior patents reveals one U.S. Patent which discloses and claims a portable bicycle repair rack suspended from a common door. U.S. Pat. No. 4,343,404 which issued Aug. 10, 1982 to Jeffery A. Folsom, discloses a door mounted rack comprising a support boom, yokes, a sliding sleeve, cables, and brackets which are attached to, and supported by, the top and facing portion of a door. Although Folsom wisely chose to utilize a common door as the vertical support member for his device, his overly complicated arrangements of both the rack itself, and its method of mounting to a door, result in a repair rack design which suffers the same limitations as other previously discussed repair stands and racks. Those limitations include: complexity of assembly and installation; lack of height adjustments; unsteadiness of the bicycle when suspended; and overall bulkiness which severely diminishes both portability and ease of storage.

OBJECTS AND ADVANTAGES OF THE PRESENT INVENTION

The present invention overcomes the shortcomings of the aforementioned bicycle repair stands and racks by the successful new combination of several elements. The utilization of any common door as a vertical support member, coupled with the simple, secure manner with which this rack adjustably mounts to the door, and the complete ease of assembly, installation, disassembly, portability, and storage, result in a bicycle supporting system capable of fulfilling the needs of bicyclists who perform their own bicycle repairs and maintenance. Additionally, this rack system's light weight and compactness provide an ideal portable repair stand for traveling and touring bicyclists.

It should be noted that, while the use of the present invention is directed towards bicycle maintenance, it is apparent that other applications of the support system or work holder are possible by the use of other support armatures having a specific shape or design adapted to the object to be supported.

Accordingly, several objects and advantages of my invention are:

a) Provide a bicycle support system that is easy to assemble and disassemble.

b) Provide a bicycle support system that is easy to install on and remove from a common door.

c) Provide a bicycle support system wherein no tools are required for installation and assembly.

d) Provide a bicycle support system wherein dis-assembly of the bicycle not required to use the rack.

e) Provide a bicycle support system wherein the bicycle is securely supported in a stable position.

f) Provide a bicycle support system that is adjustable to a broad range of convenient elevations.

g) Provide a bicycle support system that affords access to all components of a bicycle h) Provide a bicycle support system that permits unrestricted movement and operation of the bicycle's parts and drive train.

i) Provide a bicycle support system that is strong, yet lightweight, and compact when disassembled.

j) Provide a bicycle support system that is easily portable and easily stored.

k) Provide a bicycle support system that incorporates a permanent installation option.

l) Provide a bicycle support system that incorporates flexibility to support other objects in addition to bicycles.

m) Provide a bicycle support system that is economical for consumer cycling enthusiasts.

Still further objects and advantages will become apparent from a consideration of the ensuing description and accompanying drawings.

Figure 1:
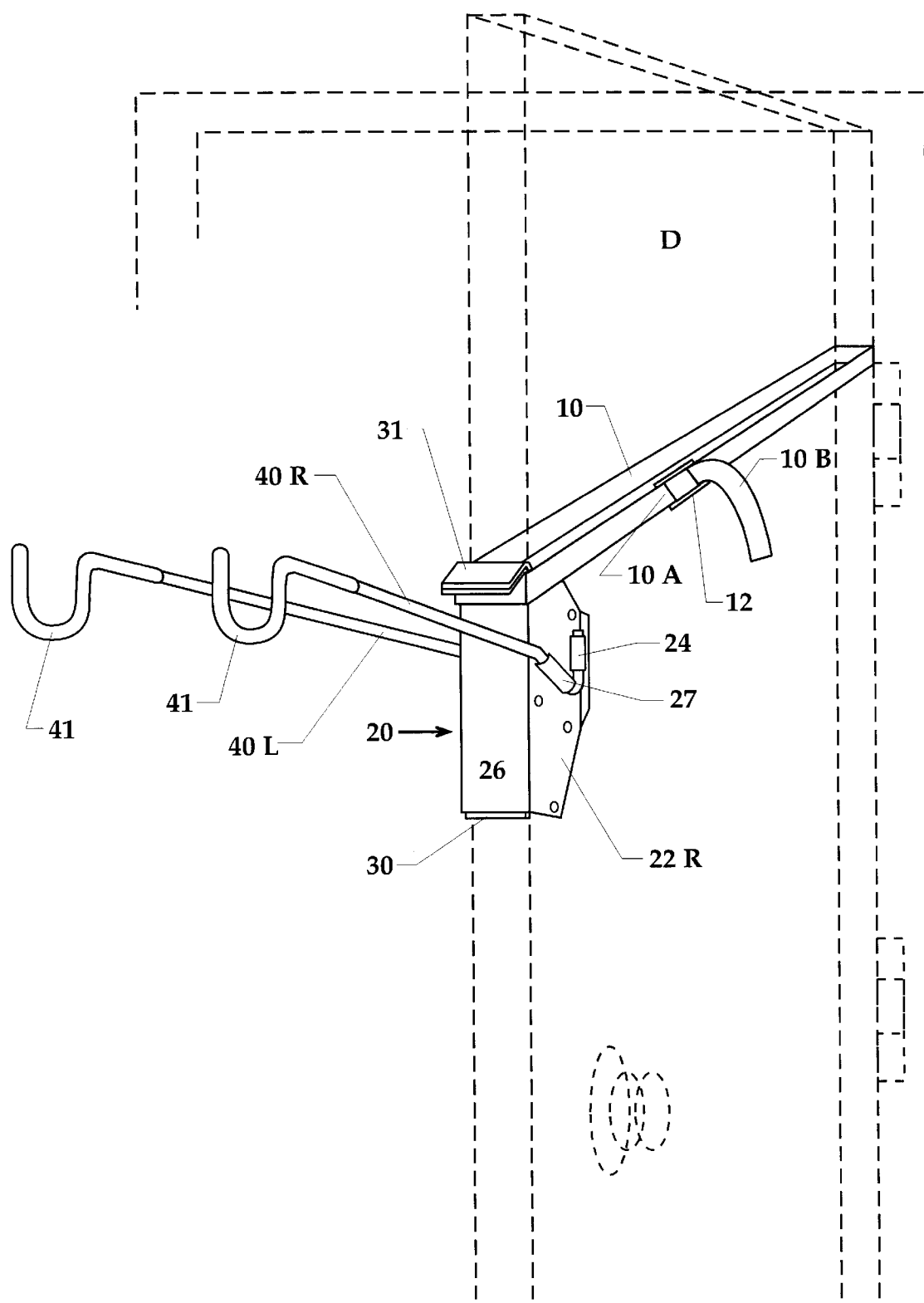
FIG. 1 is an isometric view of the Portable Bicycle Repair Rack system showing the rack installed on a common door.

| Reference Numerals in Drawings | |
|---|---|
| 10 | Retention Strap |
| 10A | Retention Strap Attached End |
| 10B | Retention Strap Adjustable End |
| 12 | Buckle |
| 20 | Bracket |
| 21 | Bracket Tab |
| 22L | Bracket Web Left |
| 22R | Bracket Web Right |
| 23 | Mounting Hole |
| 24 | Vertical Receiver |
| 25 | Tab |
| 26 | Face |
| 27 | Receiver Trough |
| 30 | Door Protector Insert |
| 31 | Door Protector Insert Tab |
| 32 | First End |
| 33 | Second End |
| 34 | Transition |
| 35 | Middle |
| 40L | Support Armature Left |
| 40R | Support Armature Right |
| 41 | Engaging Hook |
| 42 | Armature Straight Portion |
| 43 | Pin |
| D | Door |
| S | Wall Stud |

DESCRIPTION OF THE PREFERRED EMBODIMENTS

Figure 2:
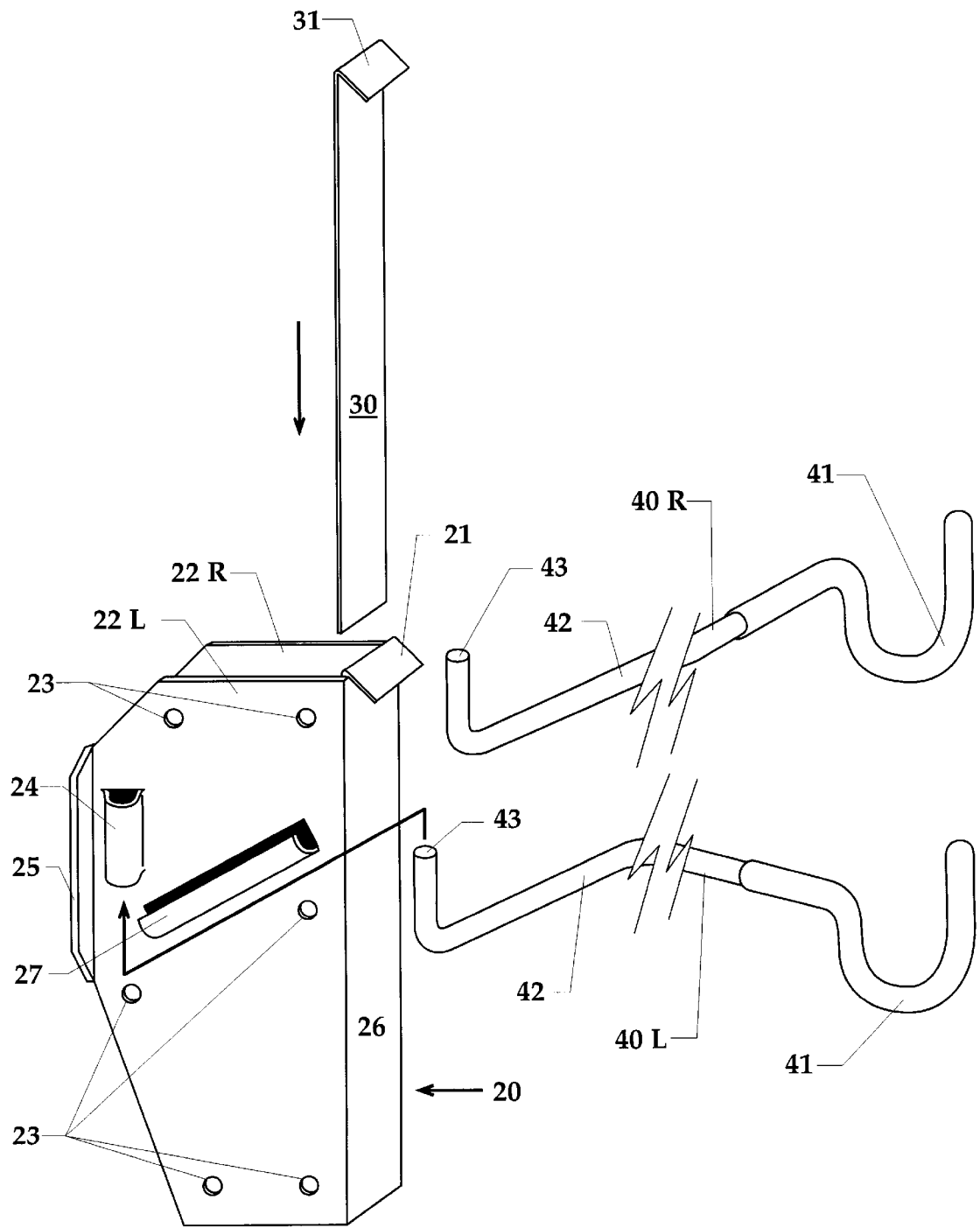
FIG. 2 is an isometric view of the Portable Bicycle Repair Rack with the door protector insert and support arms detached.
Figure 3:
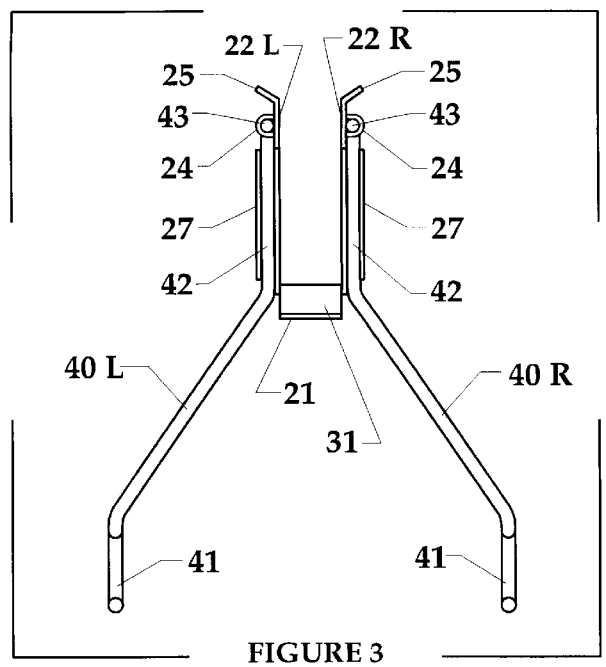
FIG. 3 is a top view of the bracket with the door protector insert and support armatures in place.

A typical embodiment of the Portable Bicycle Repair Rack system as shown in FIGS. 1–3 comprises a belt or retention strap 10, a bracket 20, a door protector insert 30, and a pair of outwardly extending support arms 40L and 40R. The rack typically is mounted on a conventional door D for entering a room, with the door opened, preferably to a position approximately perpendicular to its fully closed position. For reference, an exposed edge E and outer face F of door D are labeled in FIG. 1.

Retention strap 10 is of sufficient length to circumnavigate the door's girth above the door's upper hinge, and is preferably composed of a flexible webbing-like material, attached end 10A of which is permanently affixed to a buckle 12. An adjustable end 10B of strap 10 is threaded into and through buckle 12, extending sufficiently to afford a gripping length to enable the loosening or tightening of retention strap 10. Strap 10 operates as a tensioner relative to bracket 20, holding bracket 20 against door D when a load is placed on bracket 20.

In the preferred embodiment bracket 20 comprises an elongated U-shaped portion having a planar face 26 and two opposing wings 22L and 22R. In the installed position bracket 20 is placed over the edge of door D such that the inside surface of face 26 is oriented towards vertical edge surface E of door D, thereby forming an edge bearing that operates as a longitudinal restraint for bracket 20. Furthermore, and the inner surfaces of wings 22 project over the left and right door surfaces F, thereby forming opposing face bearings that operate as lateral restraints for bracket 20. At an upper edge or top 26T of face 26 is bracket hook 21 which engages retention strap 10 to operate as a strap retainer. A door protector insert or pad 30, composed of a nonabrasive, pressure absorptive material preferably, is interposed between the interior surface of face 26 and edge E of door D, and serves to prevent damage to edge E of door D. Door protector insert 30 is prevented from slipping through bracket 20 by door protector insert top 26T of hook 31, which engages bracket hook 21.

Still focusing on FIG. 1, support arms 40L and 40R each comprise a metal rod having an engaging hook 41 on one end, an arm straight portion 42, and a vertically oriented pin 43 at the opposing end. Support arms 40L and 40R are bent to predetermined angles and orientations with respect to pin 43, appropriate to their application as the right or left arm, respectively, and such that, when installed on bracket 20, engaging hooks 41 are oriented in a horizontal plane at a width conducive to securely cradling a bicycle top tube (not shown), each hook 41 forming a bicycle-receiving receptacle. Engaging hooks 41 preferably are coated with a soft, non-abrasive material thereby helping to avoid scratches to a bicycle or other object received by hooks 41.

Other work objects may be supported with the work holder by use of the disclosed arms, or by use of alternate arms specifically adapted to the object to be supported.

Formed on the outward facing surfaces of wings 22 are an upwardly facing open receiver trough 27 and a vertical receiver lock 24. Receiver trough 27, located at approximately the middle of wings 22, is open on its upper side, and has its axis parallel to a face of door D and projecting upwardly at a predetermined angle. Trough 27 is adapted to cradle arm straight portion 42.

Vertical receiver lock 24 is located near a rearward edge of wings 22, to the rear of and above receiver trough 27 preferably, and comprises a closed hollow cylinder with its cylindrical axis in a generally vertical orientation. Vertical receiver lock 24 and receiver trough 27 are adapted to receive pin 43 and arm straight portion 42, respectively. The orientation and alignment of receivers 24 and 27 when an arm 40 is disposed on a wing 22 is such that torsional forces applied to arm 40 by an object being supported are resisted, thereby making arm 40 stable.

A tab 25 on each web 22 provides stiffness to wings 22 and facilitates placing bracket 20 on door D.

Figure 5:
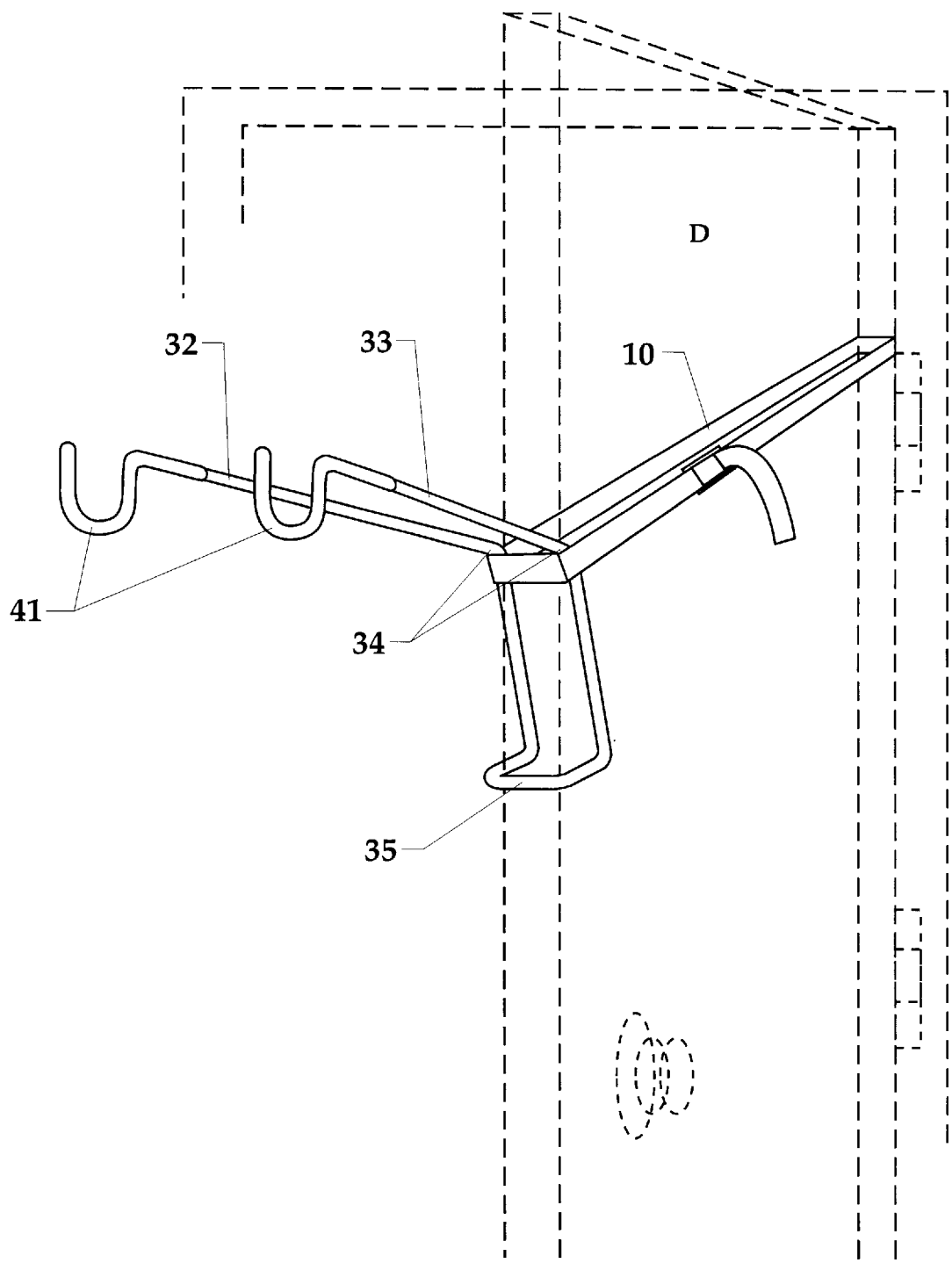
FIG. 5 shows an embodiment having an integral bracket and arms.

In another embodiment of the present invention, shown in FIG. 5, the bracket and arms are integral and formed from a single piece, preferably continuous of structural material, for example a metal rod of suitable diameter bent to a prescribed shape. In this embodiment the bracket is formed by making a series of bends at a middle portion 35, which is thus formed into a U-shaped body to straddle the edge of door D. Transitions 34 join middle 35 to first end 32 and second end 33. Transitions 34 incorporate bends of a predetermined angle such that first and second ends 32 and 33 are approximately horizontal when the work holder is mounted on a door, and operate as a strap retainer for strap 10. First and second ends 32 and 33 each have engaging hooks 41 formed thereon to cradle a top tube of a bicycle. In this embodiment the entire rack would be coated with a soft, non-abrasive material to help avoid scratches.

Figure 4:
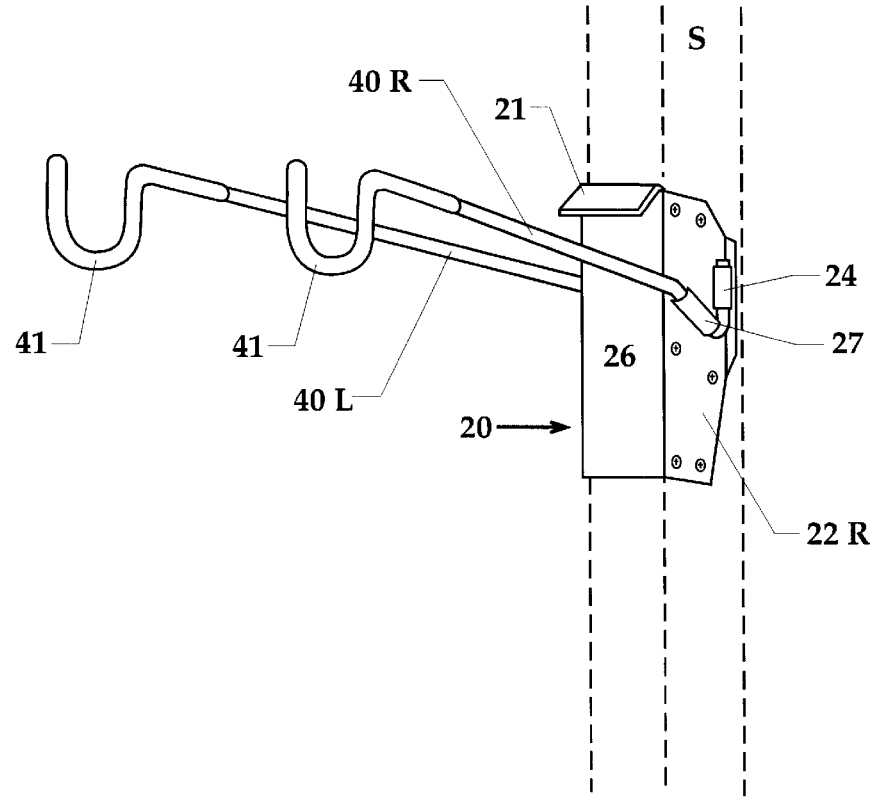
FIG. 4 shows the work holder system in a permanently mounted configuration.

Turning now to FIG. 4, mounting holes 23 in wings 22L and 22R provide for the option of permanently attaching bracket 20 to the door or to an alternative support member, for example, a bare wall stud.

Other work objects may similarly be supported with the work holder of this embodiment by the use of suitably adapted engaging pieces.

DESCRIPTION OF OPERATION OF THE PREFERRED EMBODIMENT

In using the Portable Bicycle Repair Rack, the door on which it is to be mounted is opened to a position approximately perpendicular to its fully closed position. Retention strap 10 is then looped over the top of the door in such a manner as to loosely encircle the entire door girth above the upper door hinge. Buckle 12 is positioned in a location accessible for adjustment. Using buckle 12, strap 10 is adjusted to pass across the edge of the door at approximately the desired working elevation for the support system.

Door protector insert 30 is placed in bracket 20 which is then positioned on the vertical edge of door D, with retention hook 21 uppermost, and such that wings 22L and 22R straddle the edge, at approximately the elevation desired. Bracket 20 is then moved up or down so that retention strap 10 passes over the outer surface of face 26 and engages retention hook 21. Retention strap 10 is then adjusted using buckle 12 to hold bracket 20 at the desired working elevation. Bracket 20 is thus held securely against the edge of door D.

Pin 43 of an arm 40 is then inserted into vertical receiver hook 24 from the bottom until arm straight portion 42 is above receiver trough 27. Arm 40 is then rotated towards wing 22 until arm straight portion 42 is parallel with wing 22, at which time arm 40 is lowered until arm straight portion 42 is cradled in receiver trough 27. A second arm 40 is then installed in a similar manner on the opposite wing 22.

The bicycle or other object to be supported then is placed in the repair rack by placing the top tube into engaging hooks 41, at which time work on the bicycle may commence. Further elevation adjustments can be readily accomplished by shortening or lengthening retention strap 10.

CONCLUSIONS, RAMIFICATIONS, AND SCOPE

Accordingly, the reader will see and note that the bicycle repair rack of this invention provides a lightweight, economical, easily portable bicycle work stand for a broad spectrum of bicycle enthusiasts, thus affording them a means for efficient, comfortably positioned repair and maintenance of their bicycles. Employing a common door as a vertical support member in combination with the innovative method by which the repair rack easily attaches to the door enables this portable bicycle repair rack system to successfully solve design problems which severely limit other bicycle repair racks and work stands. The advantages of this bicycle repair rack include, but are not limited to:

a) It is lightweight and compact.

b) It is portable.

c) Assembly and installation, or disassembly and removal, may be performed quickly and without tools.

d) It attaches to, and is supported by, any common door.

e) It supports a bicycle at a wide range of elevations for access to all parts of the bicycle.

f) Removal of bicycle components is not required.

g) Operation of the bicycle drive train for adjustment is unhindered.

h) It securely supports a bicycle in a stable position.

i) It is readily storable in a small space.

j) It may be permanently attached to a door or other vertical support member.

k) It is economical for consumers to purchase.

l) A wide variety of other objects may be supported by use of an appropriate arm.

Although the foregoing descriptions contain many specificities, these should not be construed as limitations on the scope of the invention. They are intended to provide exemplification of the currently preferred embodiments of this invention. For example, the bracket and support arms may be produced from any suitable material such as various types of metal or metal composite, plastic, nylon, carbon fiber, or wood products. Additionally, the fabrication methods employed in the production of the rack components may include stamping, machine casting, forging, material lamination, or injection molding. The composition of the strap may include a broad variety of materials such as nylon, plastic, vegetable fibers, rope, cable, chain, or simple leather straps.

Thus the scope of the invention should be determined by the appended claims and their legal equivalents, rather than by the examples given.

While the present invention has been shown and described by reference to the preferred embodiment, it will be apparent to those skilled in the art that other changes in form and detail may be made therein without departing from the spirit and scope of the invention defined in the appended claims.

I claim:

1. A portable work holder, which utilizes a conventional door as a vertical support member, comprising, in combination:

a bracket adapted to straddle the edge of a common door and having a plurality of arm attachment means thereon;

strapping means which circumnavigate the girth of a door and wherein said strapping means holds said bracket against an edge of a door; and at least one arm adapted to support a pre-specified object, and which removably attaches to said bracket.

2. The work holder of claim 1 further comprising a door protector insert adapted to be interposed between a door and said bracket, said door protector insert being composed of a non-abrasive, pressure absorptive material, and wherein said door protector insert acts to prevent damage to the edge surface of a door.

3. The work holder of claim 1 further comprising a plurality of arms, each of said plurality of arms being adapted to support a bicycle by one of its frame members.

4. The work holder of claim 1 wherein each of said arm attachment means and said arm further comprise torque control means, wherein said torque control means of said arm attachment means and said arm cooperate to stabilize said arm with respect to torsional forces imposed by the object being supported.

5. The work holder of claim 1 wherein said armatures are fixedly attached to said bracket.

6. The work holder of claim 1 wherein said strapping means comprise a belt having a buckle fixedly attached to one end thereof, wherein said belt and said buckle cooperate to provide a closed loop of adjustable size.

7. A portable work holder, which utilizes a conventional door as a vertical support member, comprising, in combination:

an integral bracket and arm having a bracket portion and at least one arm portion, wherein said bracket portion is adapted to straddle the edge of a common door and wherein said arm portion is adapted to support a prespecified object; and strapping means which circumnavigate the girth of a door and wherein said strapping means holds said integral bracket and arm against an edge of a door.

8. The work holder of claim 7 wherein said integral bracket and arm further has a second arm portion, said arm portions being adapted to support a bicycle.

9. The work holder of claim 7 wherein said strapping means comprises a belt having a buckle fixedly attached to one end thereof, and said belt and said buckle cooperate to provide a closed loop of adjustable size.

10. The work holder of claim 7 wherein said integral bracket and arm are formed from a single piece of material of predetermined dimensions and cross-section, and have a first and second end, a middle, and a transition portion interposed between said middle and each of said first and second ends, and wherein said middle is formed into a U-shaped portion adapted to straddle the edge of a common door;

each of said transition portions form a predetermined angle with said middle such that said arm portions extend at a predetermined angle relative to horizontal when said integral bracket and arm is mounted on a door; and each of said first and second ends further comprise an engaging hook adapted to support a pre-specified object.

11. A bicycle-supporting rack for removable attachment to a door having two opposing faces and an outer edge, comprising:

a bracket having opposing bearings for bearing on opposing faces of a door, and an edge bearing for bearing on an edge of the door;

an outwardly extending arm operatively connected to the bracket and having a bicycle-receiving receptacle spaced outwardly from the bracket; and a tensioner attached to the bracket for holding the edge bearing of the bracket in contact with a vertical edge of a door when the edge bearing is aligned with the vertical edge of the door, and for limiting the movement of the arm relative to the door when a bicycle is received by the receptacle.

12. The rack according to claim 11, wherein the arm is removable from the bracket.

13. The rack according to claim 11, wherein the bracket and arms are formed integrally from a continuous piece of structural material.

14. The rack according to claim 11, wherein the bracket includes an upwardly facing open trough and an approximately vertical lock, and the arm includes a vertical pin for mating with the lock so that the arm is held by the trough and locked in position by the lock.

15. The rack according to claim 11, wherein the bracket includes an upwardly sloped open-ended channel for slidably receiving the arm in a supporting position through an open end and along an axis of the channel.

16. The rack according to claim 11, further comprising a door-protecting pad removably hung on the bracket by a downwardly extending hook formed adjacent a top of the pad.

17. A portable object support for use with a door, comprising:

a main body having opposing lateral restraints, a strap retainer, and a longitudinal restraint spaced apart from the strap retainer and located between the lateral restraints;

a strap retained in the strap retainer; and an outwardly extending arm attached to the main body;

wherein the lateral restraints are sized to bear on opposite outer faces of a door, the longitudinal restraint is arranged relative to the lateral restraints to bear on an edge of the door and the strap is sized to extend around the edge, outer faces and another edge of the door.

18. The support according to claim 17, wherein the arm is removable from the body.

19. The support according to claim 17, wherein the body and the arm are formed integrally from a continuous piece of structural material.

20. The support according to claim 17, wherein the body includes an upwardly facing open trough and an approximately vertical lock, and the arm includes a vertical pin for mating with the lock so that the arm is held by the trough and locked in position by the lock.

21. The support according to claim 17, wherein the body includes an upwardly sloped open-ended channel for slidably receiving the arm in a supporting position through an open end and along an axis of the channel.

22. The support according to claim 17, further comprising a door-protecting pad removably hung on the body by a downwardly extending hook formed adjacent a top of the pad.

23. A removable rack for supporting a load on a door, comprising:

an elongate U-shaped bracket having an approximately planar face interconnecting opposing wings, the face including a top and a bottom when viewed along a line perpendicular to the planar face;

a strap retainer formed adjacent the top of the face; and an arm attached to the bracket and extending outwardly from the planar face in a direction opposite the opposing wings.

24. The rack according to claim 23, wherein the arm is removable from the bracket.

25. The rack according to claim 23, wherein the bracket includes an upwardly facing open trough and an approximately vertical lock, and the arm includes a vertical pin for mating with the lock so that the arm is held by the trough and locked in position by the lock.

26. The rack according to claim 23, wherein the bracket includes an upwardly sloped open-ended channel for slidably receiving the arm in a supporting position through an open end and along an axis of the channel.

27. The rack according to claim 23, further comprising a door-protecting pad removably hung on the bracket by a downwardly extending hook formed adjacent a top of the pad.

28. A bicycle supporting rack comprising:
  an upright door having an exposed edge and opposing faces adjacent the exposed edge;
  removable support structure including outwardly extending arms, an edge bearing in contact with the edge of the door, and opposing face bearings corresponding to the opposing faces of the door; and
  a strap connected to the removable support and encircling the exposed edge and opposing faces of the door.

29. The rack according to claim 28, wherein the arms are removable from the support structure.

30. The rack according to claim 28, wherein the support structure and arms are formed integrally from a continuous piece of structural material.

31. The rack according to claim 28, wherein the support structure includes an upwardly facing open trough and an approximately vertical lock, and the arm includes a vertical pin for mating with the lock so that the arm is held by the trough and locked in position by the lock.

32. The rack according to claim 28, wherein the support structure includes an upwardly sloped open-ended channel for slidably receiving the arm in a supporting position through an open end and along an axis of the channel.

33. The rack according to claim 28, further comprising a door-protecting pad removably hung on the support structure by a downwardly extending hook formed adjacent a top of the pad.

34. A door-supported work stand comprising:
  a strap for encircling a door;
  a bracket having a strap-receiving portion for being supported by the strap when the bracket is entrapped between the strap and the door, an edge bearing spaced away from the strap-receiving portion for bearing on an edge of the door, and a pair of opposing face bearings located between the strap-receiving portion and the edge bearing for bearing on opposing faces of the door; and
  an arm extending outwardly from the bracket having a receptacle for an object, the receptacle being spaced away from the bracket.

35. The work stand according to claim 34, wherein the arm is removable from the bracket.

36. The work stand according to claim 34, wherein the bracket and the arm are formed integrally from a continuous piece of structural material.

37. The work stand according to claim 34, wherein the bracket includes an upwardly facing open trough and an approximately vertical lock, and the arm includes a vertical pin for mating with the lock so that the arm is held by the trough and locked in position by the lock.

38. The work stand according to claim 34, wherein the bracket includes an upwardly sloped open-ended channel for slidably receiving the arm in a supporting position through an open end and along an axis of the channel.

39. The work stand according to claim 34, further comprising a door-protecting pad removably hung on the bracket by a downwardly extending hook formed adjacent a top of the pad.

40. A bicycle-supporting rack for removable attachment to a door having two opposing faces and an outer edge, comprising:
  a bracket having opposing bearings for beating on opposing faces of a door, and an edge bearing for bearing on an edge of the door;
  an outwardly extending arm formed integrally with the bracket from a continuous piece of structural material and having a bicycle-receiving receptacle spaced outwardly from the bracket; and
  a tensioner attached to the bracket for holding the edge bearing of the bracket in contact with an edge of a door when the edge bearing is aligned with the edge of the door, and for limiting the movement of the arm relative to the door when a bicycle is received by the receptacle.

41. A bicycle-supporting rack for removable attachment to a door having two opposing faces and an outer edge, comprising:
  a bracket having opposing bearings for bearing on opposing faces of a door, an edge bearing for bearing on an edge of the door, an upwardly facing open trough and an approximately vertical lock;
  an outwardly extending arm operatively connected to the bracket and having a bicycle-receiving receptacle spaced outwardly from the bracket, and a vertical pin for mating with the bracket lock so that the arm is held by the bracket trough and locked in position by the bracket lock; and
  a tensioner attached to the bracket for holding the edge bearing of the bracket in contact with an edge of a door when the edge bearing is aligned with the edge of the door, and for limiting the movement of the arm relative to the door when a bicycle is received by the receptacle.

42. A bicycle-supporting rack for removable attachment to a door having two opposing faces and an outer edge, comprising:
  a bracket having an upwardly sloped open-ended channel, opposing bearings for bearing on opposing faces of a door, and an edge bearing for bearing on an edge of the door;
  an outwardly extending arm operatively connected to the bracket and having a bicycle-receiving receptacle spaced outwardly from the bracket, the arm sized to be slidably received by the bracket in a supporting position through an open end and along an axis of the bracket channel; and
  a tensioner attached to the bracket for holding the edge bearing of the bracket in contact with an edge of a door when the edge bearing is aligned with the edge of the door, and for limiting the movement of the arm relative to the door when a bicycle is received by the receptacle.

43. A removable rack for supporting a load on a door, comprising:
  an elongate U-shaped bracket having an upwardly facing open trough and an approximately vertical lock, an approximately planar face interconnecting opposing wings, the face including a top and a bottom when viewed along a line perpendicular to the planar face;
  a strap retainer formed adjacent the top of the face; and
  an outwardly extending arm attached to the bracket, the arm having a vertical pin for mating with the bracket lock so that the arm is held by the bracket trough and locked in position by the lock.

44. A removable rack for supporting a load on a door, comprising:
  an elongate U-shaped bracket having an upwardly sloped open-ended channel and an approximately planar face interconnecting opposing wings, the face including a top and a bottom when viewed along a line perpendicular to the planar face;
  a strap retainer formed adjacent the top of the face; and
  an outwardly extending arm attached to the bracket, the arm sized to be slidably received by the bracket in a supporting position through an open end and along an axis of the bracket channel.

* * * * *